(12) United States Patent
Yu et al.

(10) Patent No.: US 8,605,136 B2
(45) Date of Patent: Dec. 10, 2013

(54) 2D TO 3D USER INTERFACE CONTENT DATA CONVERSION

(75) Inventors: Yang Yu, San Diego, CA (US); Robert Blanchard, Escondido, CA (US); Steven Richman, San Diego, CA (US)

(73) Assignee: Sony Corporation, Tokyo (JP)

( * ) Notice: Subject to any disclaimer, the term of this patent is extended or adjusted under 35 U.S.C. 154(b) by 430 days.

(21) Appl. No.: 12/853,736

(22) Filed: Aug. 10, 2010

(65) Prior Publication Data

US 2012/0038745 A1 Feb. 16, 2012

(51) Int. Cl.
*H04N 7/18* (2006.01)

(52) U.S. Cl.
USPC .................................. 348/51; 348/46; 348/43

(58) Field of Classification Search
USPC ...................................................... 348/42–61
See application file for complete search history.

(56) References Cited

U.S. PATENT DOCUMENTS

| | | | |
|---|---|---|---|
| 6,243,054 B1 | 6/2001 | DeLuca | |
| 6,344,860 B1 | 2/2002 | Watts | |
| 6,798,409 B2 * | 9/2004 | Thomas et al. | 345/427 |
| 8,269,821 B2 * | 9/2012 | Card, II | 348/51 |
| 2002/0054207 A1 | 5/2002 | Iizuka et al. | |
| 2002/0113753 A1 | 8/2002 | Sullivan et al. | |
| 2002/0114078 A1 * | 8/2002 | Halle et al. | 359/619 |
| 2005/0285853 A1 | 12/2005 | Morita et al. | |
| 2007/0003134 A1 | 1/2007 | Song et al. | |
| 2010/0111358 A1 | 5/2010 | Chai et al. | |
| 2010/0150523 A1 * | 6/2010 | Okubo et al. | 386/68 |
| 2011/0175988 A1 * | 7/2011 | Luthra et al. | 348/51 |

FOREIGN PATENT DOCUMENTS

| | | | |
|---|---|---|---|
| JP | 2007-317050 | 12/2007 | |
| WO | WO 2008/044191 | 4/2008 | |
| WO | WO 2008/115222 | 9/2008 | |
| WO | WO 2010/058362 | 5/2010 | |
| WO | WO 2010/058362 A1 * | 5/2010 | H04N 13/00 |

OTHER PUBLICATIONS

International Search Report and Written Opinion, corresponding PCT/US2011/44524, Dec. 8, 2011 (Dec. 14, 2011).
Jacoby et al., "Using Virtual Menus in a Virtual Environment," Human Factors NASA publication, 1992.
Steincke et al., "Multi-Touching 3D Data: Towards Direct Interaction in Stereoscopic Display Environments Coupled with Mobile Devices," VisCG Uni-Muenster publication, 2008.
Schmalstieg et al., "Using Transparent Props for Interaction with the Virtual Table," Symposium on Interactive 3D Graphics, 1999.
Vinson, "3D TV is Not a STB with a 3D UI," Jeff Vinson's IPTV Blog, Sep. 12, 2009.
Anonymous, "Navigating 3DTV," IBCE-Daily, Sep. 15, 2009.
Keslassy, "Stereo Subtitles Still a Problem in Europe," Variety.com website, Jun. 12, 2009.

* cited by examiner

*Primary Examiner* — Andy Rao
(74) *Attorney, Agent, or Firm* — Miller Patent Services; Jerry A. Miller

(57) ABSTRACT

A method of two dimensional (2D) content data conversion to three dimensional (3D) content data in a 3D television involves receiving 3D video content and 2D user interface content data via a 2D to 3D content conversion module. A displacement represented by disparity data that defines a separation of left eye and right eye data for 3D rendering of the 2D user interface content data is determined. The 3D video content is displayed on a display of the 3D television. 3D user interface content data is generated at a 3D depth on the display based upon the received 2D user interface content data and the determined displacement. This abstract is not to be considered limiting, since other embodiments may deviate from the features described in this abstract.

33 Claims, 6 Drawing Sheets

2D TO 3D USER INTERFACE CONTENT DATA CONVERSION

CROSS REFERENCE TO RELATED DOCUMENTS

This application is related to U.S. Provisional Patent Application 61/153,720 filed Feb. 19, 2009 and U.S. patent application Ser. No. 12/589,837 filed Oct. 29, 2009 both to Jean-Pierre Guillou which are hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

There are a number of known ways for user interfaces (UI's) to interact with visual content on a display such as a television display. For example, the UI may be somewhat transparent to permit the viewer to view content that is beneath the UI, or the UI may be placed in a window or box that covers a portion of the screen. Commonly when a UI is present it will have an area of transparency that allows the user to see both the UI and the content. However, the issues surrounding how to deal with a UI or other 2 dimensional content when a television display or the like is displaying stereoscopic content has not been explored to any known extent except in the above-identified patent application to Guillou, which is commonly owned by the assignee of the present application.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
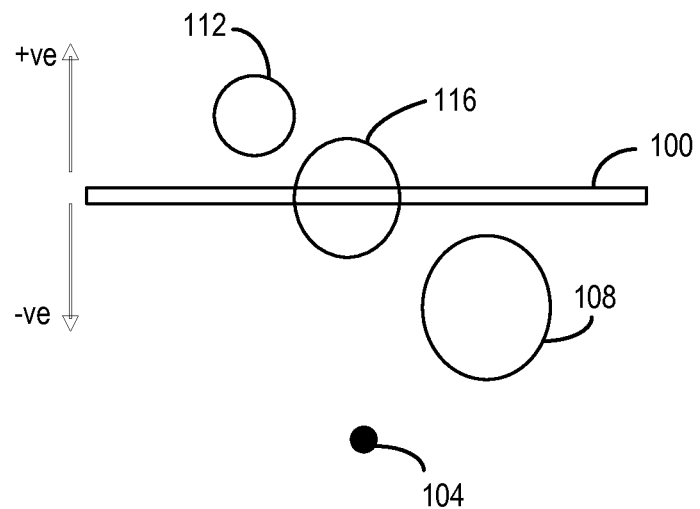
FIG. 1 is an illustration of an example of a stereoscopic display panel of any suitable design taken as a view from above consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "program" or "computer program" or similar terms, as used herein, is defined as a sequence of instructions designed for execution on a computer system. A "program," or "computer program," may include a subroutine, a function, a procedure, an object method, an object implementation, in an executable application, an applet, a servlet, a source code, an object code, a shared library/dynamic load library and/or other sequence of instructions designed for execution on a computer system.

The term "program," as used herein, may also be used in a second context (the above definition being for the first context). In the second context, the term may be used in the sense of a "television program." In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment," "certain embodiments," "an embodiment," "an example," "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

The term 3D or three dimensional as used herein is intended to apply to stereoscopic three dimensional visual experiences. Such experiences may be created in a number of ways including use of images that are separately polarized for each eye or color filtered for each eye. In particular, within the context of the present invention, three dimensional visual experiences are created by generation and display of separate left eye and right eye images. Such images are viewed on a display device that presents separate images for each eye, where either active techniques such as alternating synchronized blocking and passing of the images viewed by each eye is used to create separation of the left eye and right eye images, or passive techniques such as polarized or colored glasses are used to separate left eye and right eye images, thereby producing the stereoscopic three dimensional visual experience illusion.

The term "disparity" as used herein represents a displacement of a projected point in one stereoscopic image (e.g., left eye) with respect to the other stereoscopic image (e.g., right eye—or vice versa). In the case of closed captions, disparity can be only a horizontal or other displacement between the left and right eye views. In the case of graphics, the disparity may be different for each pixel. When generated by calculation rather than by a set of stereoscopic cameras, one may presume that a horizontal or other displacement of a virtual camera should be computed when the left and right view are rendered. In any case, the term disparity or disparity data can refer to either a single amount of displacement in one direction for each pixel or a displacement set of data or relationship representing how each pixel should be displaced from pixels in the other view.

Disparity data may further be referred to as parallax. Parallax represents a differential viewing perspective of an object when moved to different locations or when brought closer to a viewer relative to other objects. As such, for purposes of the present description, parallax may be used to set and adjust a perspective of an image when the image is located, or when the image is moved or resized, respectively, relative to other displayed objects. Further, parallax is considered "negative" when an object is brought closer toward a viewer's perspective and is considered "positive" when an object is moved away from a viewer's perspective in 3D viewing space.

In 3D television, the current user interface graphic plane, closed captions display plane, and other graphic layers do not have depth parameters. Thus, they appear as 2 dimensional (2D) images. This is divergent with the 3D video planes and can, for some users, cause uncomfortable viewing. In example implementations consistent with embodiments of the present invention, depth parameters (e.g., disparity data and/or parallax data) are delivered together with the user interface graphic plane, closed captions display plane, and other graphic layers. Unlike the 2D user interface graphic plane, two user interface graphic planes (views) are constructed or delivered. For a 2D graphic user interface or closed captions, besides delivering the normal 2D graphics, another copy of the graphics is rendered at some horizontal or other displacement. For a 3D graphic user interface, another view of the graphics is rendered at a different camera position. In this way, the 3D effect for the user interface graphics (either 2D or 3D graphics) and captions may be achieved. In 2D user interface and captions, the creation is in the 2D space.

By changing the disparity of the two views, user interface and captions creation in 3D space may be achieved. Finally, user interaction with the user interface and captions may be extended to 3D space by permitting the user to adjust the depth (e.g., disparity) parameters associated with the graphics or captions. This allows perceptual movement of the graphics or caption forward or backwards within the 3D picture rendered on the screen and independently of the 3D picture on the screen. The user may further move the caption window around the display screen. For example, a user may bring a created 3D user interface element closer and toward a center of a display screen in 3D space to view the content, and then move it further away and toward a corner to view 3D video content displayed on the display. By use of pixel modification techniques, such as inter-pixel interpolation, generated 3D content may also be increased in size. Reduction in size may also be achieved by similar processing to reduce the pixel content information. For text, larger and smaller fonts may be used to increased and decrease a size of generated 3D content, respectively. In such situations, a user may leave a user interface element opened for ready access rather than closing the user interface element entirely. As such, the techniques described herein provide a more flexible and enjoyable consumer experience.

By delivering or creating two views of the user interface graphics and captions along with generating or delivering disparity data, depth perception may be provided or created. The depth perception may be adjusted by permitting the user to change the disparity between two views or by changing the positions of the cameras in 3D graphics, which enable creation of the user interface and captions in 3D space, and which enable consumer interaction with the user interface graphics and captions in 3D space. Such techniques may be used with the user interface, caption rendering, subtitles, and other graphics planes. It is possible to use these techniques in digital cinema systems, televisions, and set-top boxes such as cable, satellite, and media players (DVD, etc.).

Hence, in certain implementations consistent with embodiments of the present invention a method provides depth perception to the graphical user interface (GUI) as well as to the closed caption display of a 3D television (3D TV).

Figure 2:
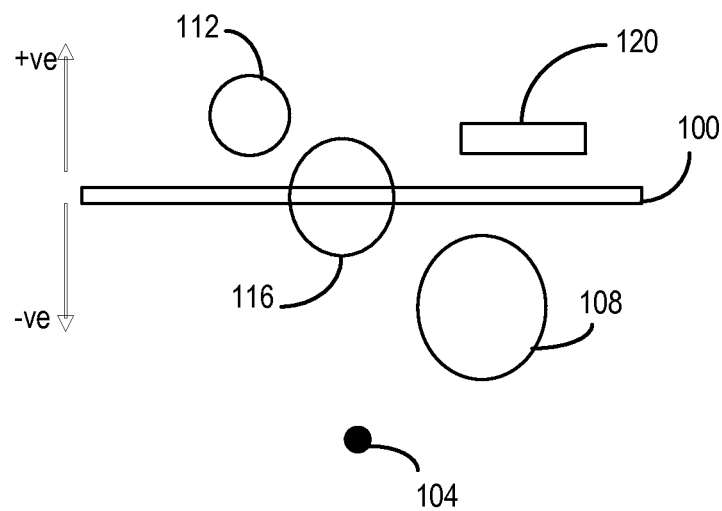
FIG. 2 is an illustration of an example of a stereoscopic display panel of any suitable design taken as a view from above that includes a three dimensional (3D) user interface (UI) element consistent with certain embodiments of the present invention.

FIG. 1 and FIG. 2 are illustrations of an example of an implementation of a stereoscopic display panel 100 of any suitable design taken as a view from above. It is understood that the stereoscopic display panel 100 may alternatively be termed a 3D display panel. A position 104 of a viewer represents a location in front of the stereoscopic display panel 100. The illustration shows that by using stereoscopy technology, an illusion may be created wherein a viewer located at the position 104 can appear to see objects that are either situated in front of the plane of the stereoscopic display panel 100 with varying depths −ve (e.g., negative parallax) such as object 108, or may see objects such as object 112 that appear to be situated behind the stereoscopic display panel 100 with varying depths +ve (e.g., positive parallax). The viewer may also see objects that appear to straddle the plane of the stereoscopic display panel 100 such as object 116. As can be seen from FIG. 1, the object 108 appears to be larger and closer as if displayed in front of the stereoscopic display panel 100 relative to the object 116 and further forward relative to the object 112. This perspective change may be made by adjusting the disparity of the respective objects, the parallax of the respective objects, and the size of the respective objects, as described above. As such, both the apparent distance of objects from the viewer at the position 104 and their apparent perspective relative to other objects may be changed and objects may appear to have a depth that spans a distance along a continuum from somewhere on the −ve scale to somewhere on the +ve scale. Alternatively, by adjusting only the disparity and the parallax, a depth of an object may be changed to adjust the apparent distance of the object from the viewer at the position 104 without a size adjustment. In the scale depicted, +ve represents the space behind the plane of the stereoscopic display panel 100 relative to the viewer's position 104 and −ve represents the space in front of the stereoscopic display panel 100 relative to the viewer's position 104. In each illustration, the objects 108, 116 and 112 are illustrative of portions of the primary image displayed on the stereoscopic display panel 100.

In view of the three dimensional illusion created by the stereoscopic display panel 100, when one interposes a 2D user interface (UI) into the displayed image, there can be a problem with the user having a comfortable interaction of the 2D UI and 3D video content on the stereoscopic display panel 100. Referring to FIG. 2, now consider that a 3D UI element 120 is juxtaposed into the three dimensional image associated with the objects 108, 116 and 112. By providing the user with the ability to control the disparity of two 2D images (distance between the left eye and right eye images), the 3D UI element 120 positioned at any desired depth or location of the display may be produced. The user may utilize any suitable navigation controls from a remote controller to position the 3D UI element 120 at any position on the stereoscopic display panel 100 and/or at any depth along the +ve and −ve depth axis. Additionally, the left eye and right eye images may be created locally at a display device (e.g., a television, set top box, or other TV receiver device) or may be generated and sent for display as desired. In the case of closed caption data or subtitle data, for example, the left eye and right eye images may accompany the primary content (e.g., a television program or movie). Alternatively, left and right eye images for menu items, guide data and other metadata may be produced locally in response to receipt of a single copy of the respective data at the time of generation for display.

Hence, the user may move the 3D UI element 120 to any comfortable viewing location and position (e.g., depth—forward or backward, or vertically and horizontally) as desired within a 3D viewing space created by the stereoscopic display panel 100.

Five elements of data may be used to construct a 3D UI element 120 consistent with certain implementations of the present invention: X position (horizontal), Y position (vertical), left eye graphic, right eye graphic, and disparity. In this example, the X and Y position data may define a position or location on the display of either the left eye or right eye data and the disparity data defines the horizontal or other displacement (e.g., distance) between the two images, and as such, the perceived depth of the 3D UI element 120 relative to other 3D video content displayed within the stereoscopic display panel 100. In other implementations, the user may also exercise control over the X and Y position data to allow movement of the 3D UI element 120 within a plane defined by a surface of the stereoscopic display panel 100 on which an X and Y axis allow measurement of differences between X position and Y position changes. Further, a size of the 3D UI element 120 may be adjusted, as described above, to create perspective relative to other displayed 3D content. As such, this control may be exercised over any 3D merged or graphic overlay image including closed caption data, electronic program guide data (EPG), graphical box overlays or persistent widgets.

Opacity of a 3D user interface element may also be adjusted using alpha blending. Alpha blending is the process of combining a translucent foreground color with a background color, thereby producing a new blended color. The degree of the foreground color's translucence may range from completely transparent to completely opaque. If the foreground color is completely transparent, the blended color will be the background color. Conversely, if the foreground color is completely opaque, the blended color will be the foreground color.

For purposes of the present subject matter, it is understood that several forms of 3D content are presently available. For example, 3D video content may be encoded for polarized, frame sequential, or 3D-capable display output devices. For polarized encoding, 3D video content may be generated by merging left and right images in either a side-by-side or top-and-bottom format on each frame of video content. At rendering, these images are scaled and formatted with opposite circular polarization onto odd and even lines of each displayed video frame, respectively. Passive polarized 3D glasses are used to present the left and right eye images to the viewer. Alternatively, a frame sequential format operating at twice the frame rate of polarized encoding may be used such that each of the left and right images is sequentially rendered. Active 3D glasses are used to synchronize with and select which lens is active for each sequential frame. Resolution of 3D imaging may be compromised using either of the described 3D encoding and rendering options. Alternatively, 3D-capable displays are available that perform the conversion of 3D video content to a 3D rendered output and may have a higher rendering resolution for 3D content than either of the approaches that use passive or active glasses. It should be understood that the present subject matter applies to the above-described and any other 3D video content encoding and rendering formats. It is also understood that a person of ordinary skill in the art will be able to implement the present subject matter based upon the present description. As such, further details of 3D encoding and rendering will not be described herein.

Figure 3:
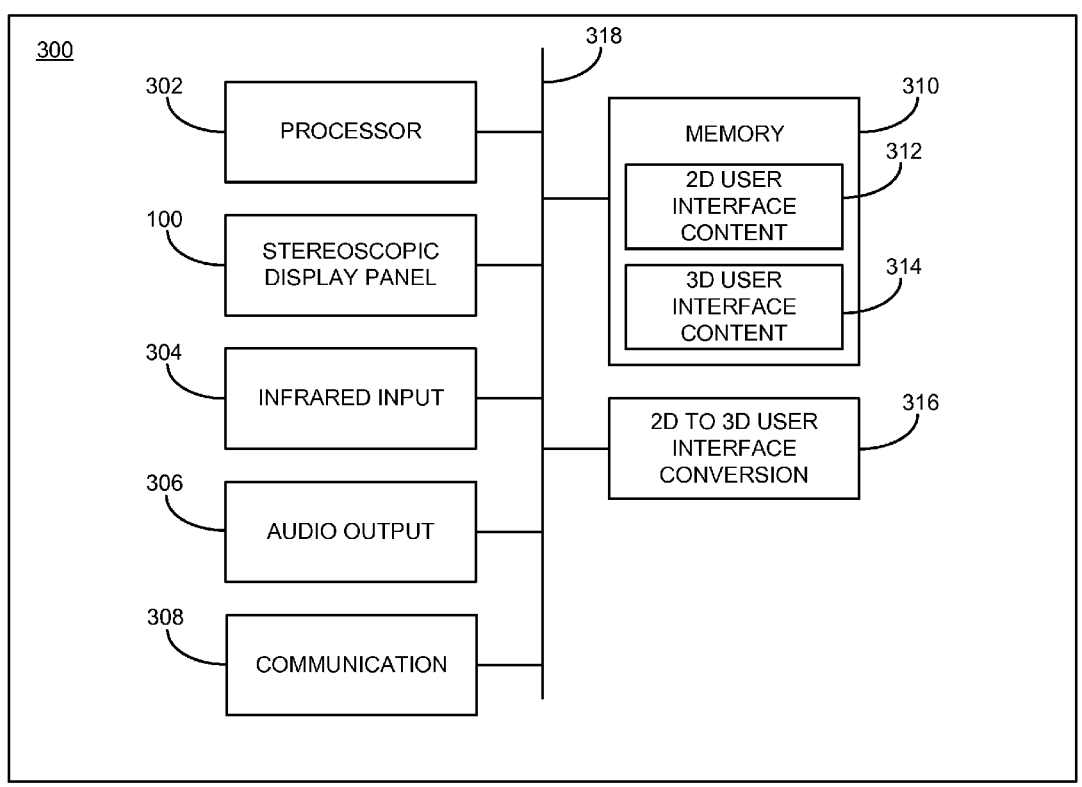
FIG. 3 is a block diagram of an example of an implementation of a display device that provides 2D to 3D user interface content data conversion consistent with certain embodiments of the present invention.

FIG. 3 is a block diagram of an example of an implementation of a display device 300 that provides 2D to 3D user interface content data conversion. A processor 302 provides computer instruction execution, computation, and other capabilities within the display device 300. The stereoscopic display panel 100, as described above, provides visual and/or other information to a user of the display device 300, including 3D video content output and output of converted 2D user interface content in a 3D format merged with or overlaid upon the 3D video content. The stereoscopic display panel 100 may include any type of stereoscopic display device, such as a cathode ray tube (CRT), liquid crystal display (LCD), light emitting diode (LED) display, projection or other display element or panel (either integral or external to a television set), and may further include a 3D-capable display output device. An infrared input device 304 provides input capabilities for the user of the display device 300 via a device, such as an infrared remote control device (not shown).

An audio output device 306 provides audio output capabilities for the display device 300, such as audio output associated with displayed video content. The audio output device 306 may include a speaker, driver circuitry, and interface circuitry as appropriate for a given implementation.

A communication module 308 provides communication capabilities for interaction with the display device 300, such as for retrieval of audio and video content via a satellite, cable, the Internet, or other content provider, and other activities as appropriate for a given implementation. The communication module 308 may support wired or wireless standards appropriate for a given implementation. Example wired standards include Internet video link (IVL) interconnection such as Sony Corporation's Bravia™ Internet Video Link (BIVL™) within a home network. Example wireless standards include cellular wireless communication and Bluetooth® wireless communication standards. The communication module 308 may also support a digital living network alliance (DLNA) or other network interface. Many other wired and wireless communication and interface standards are possible and all are considered within the scope of the present subject matter.

It should be noted that the communication module 308 is illustrated as a component-level module for ease of illustration and description purposes. It is also understood that the communication module 308 may include any hardware, programmed processor(s), and memory used to carry out the functions of the communication module 308. For example, the communication module 308 may include additional controller circuitry in the form of application specific integrated circuits (ASICs), processors, antenna(s), and/or discrete integrated circuits and components for performing electrical control activities associated with the communication module 308. Additionally, the communication module 308 may include interrupt-level, stack-level, and application-level modules as appropriate. Furthermore, the communication module 308 may include any memory components used for storage, execution, and data processing by these modules for performing processing activities associated with the communication module 308. The communication module 308 may also form a portion of other circuitry described below without departure from the scope of the present subject matter.

A memory 310 includes a 2D user interface content storage area 312 and a 3D user interface content storage area 314. The 2D user interface content storage area 312 may store received 2D user interface content data and may further store disparity data received with the 2D user interface content data. Copies of the received 2D user interface content data, whether received or generated, may also be stored within the 2D user interface content storage area 312. The 3D user interface content storage area 314 stores converted 2D user interface content data that has been prepared for merging with 3D video content. Examples of converted 2D user interface content data include 3D graphical overlay objects generated based upon the received 2D user interface content data and horizontal displacement or other directional displacement information determined from received disparity data. The horizontal or other directional displacement information may be used to generate the 3D graphical overlay objects or for insertion/merging of 2D user interface content data with left-image stripes and right-image stripes of 3D video content, and may be used to position copies of the 2D user interface content data on sequential left and right frames for frame sequential 3D rendering, as appropriate for a given implementation.

It is understood that the memory 310 may include any combination of volatile and non-volatile memory suitable for the intended purpose, distributed or localized as appropriate, and may include other memory segments not illustrated within the present example for ease of illustration purposes. For example, the memory 310 may include a code storage area, a code execution area, and a data area without departure from the scope of the present subject matter.

A 2D to 3D user interface conversion module 316 is also illustrated. The 2D to 3D user interface conversion module 316 provides 2D to 3D conversion processing for the display device 300, as described above and in more detail below. The 2D to 3D user interface conversion module 316 implements the automated 2D to 3D user interface content data conversion of the display device 300.

Though the 2D to 3D user interface conversion module 316 is illustrated as a component-level module for ease of illustration and description purposes, it should be noted that the 2D to 3D user interface conversion module 316 may include any hardware, programmed processor(s), and memory used to carry out the functions of this module as described above and in more detail below. For example, the 2D to 3D user interface conversion module 316 may include additional controller circuitry in the form of application specific integrated circuits (ASICs), processors, and/or discrete integrated circuits and components for performing communication and electrical control activities associated with the respective devices. Additionally, the 2D to 3D user interface conversion module 316 may also include interrupt-level, stack-level, and application-level modules as appropriate. Furthermore, the 2D to 3D user interface conversion module 316 may include any memory components used for storage, execution, and data processing for performing processing activities associated with the module.

It should also be noted that the 2D to 3D user interface conversion module 316 may form a portion of other circuitry described without departure from the scope of the present subject matter. Further, the 2D to 3D user interface conversion module 316 may alternatively be implemented as an application stored within the memory 310. In such an implementation, the 2D to 3D user interface conversion module 316 may include instructions executed by the processor 302 for performing the functionality described herein. The processor 302 may execute these instructions to provide the processing capabilities described above and in more detail below for the display device 300. The 2D to 3D user interface conversion module 316 may form a portion of an interrupt service routine (ISR), a portion of an operating system, a portion of a browser application, or a portion of a separate application without departure from the scope of the present subject matter.

The processor 302, the stereoscopic display panel 100, the infrared input device 304, the audio output device 306, the memory 310, and the 2D to 3D user interface conversion module 316 are interconnected via one or more interconnections shown as interconnection 318 for ease of illustration. The interconnection 318 may include a system bus, a network, or any other interconnection capable of providing the respective components with suitable interconnection for the respective purpose.

FIG. 4 through FIG. 6B below describe example processes that may be executed by such devices, such as the display device 300, to perform the automated 2D to 3D user interface content data conversion associated with the present subject matter. Many other variations on the example processes are possible and all are considered within the scope of the present subject matter. The example processes may be performed by modules, such as the 2D to 3D user interface conversion module 316 and/or executed by the processor 302, associated with such devices. It should be noted that time out procedures and other error control procedures are not illustrated within the example processes described below for ease of illustration purposes. However, it is understood that all such procedures are considered to be within the scope of the present subject matter.

Figure 4:
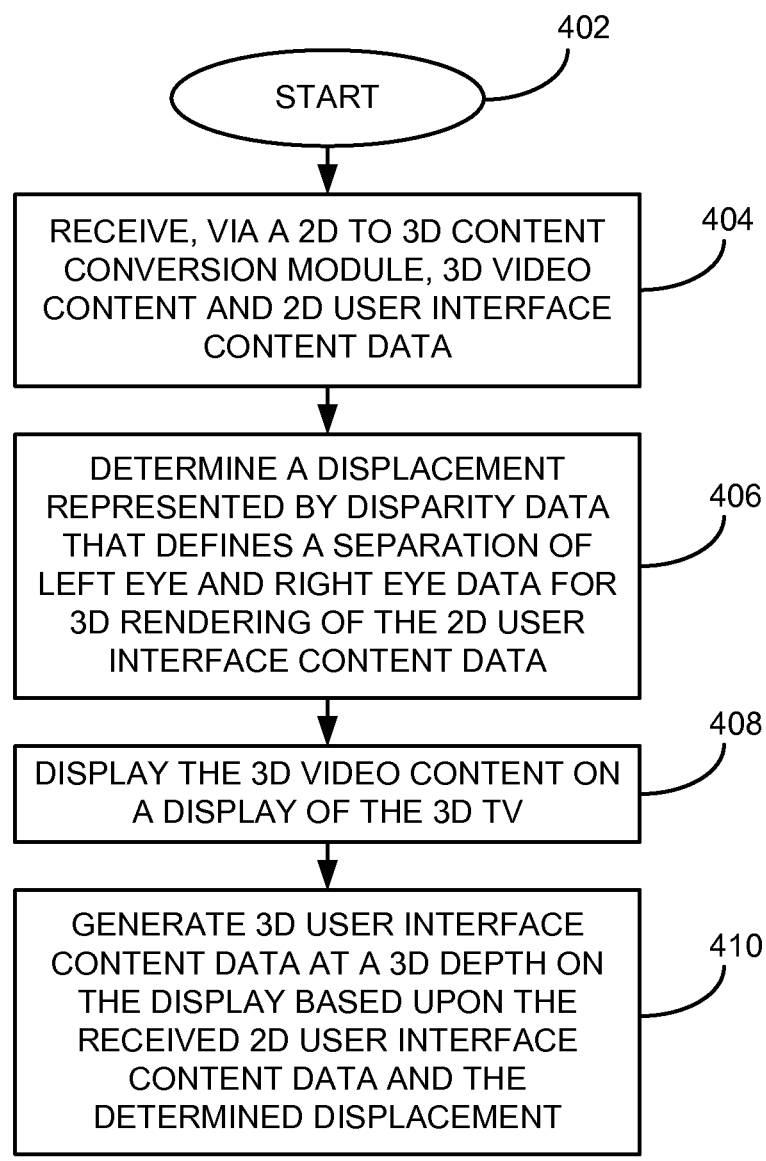
FIG. 4 is a flow chart of an example of an implementation of a process that provides automated 2D to 3D user interface content data conversion consistent with certain embodiments of the present invention.

FIG. 4 is a flow chart of an example of an implementation of a process 400 that provides automated 2D to 3D user interface content data conversion. The process 400 starts at 402. At block 404, the process 400 receives, via a 2D to 3D content conversion module, 3D video content and 2D user interface content data. At block 406, the process 400 determines a displacement represented by disparity data that defines a separation of left eye and right eye data for 3D rendering of the 2D user interface content data. At block 408, the process 400 displays the 3D video content on a display of the 3D TV. At block 410, the process 400 generates 3D user interface content data at a 3D depth on the display based upon the received 2D user interface content data and the determined displacement.

Figure 5:
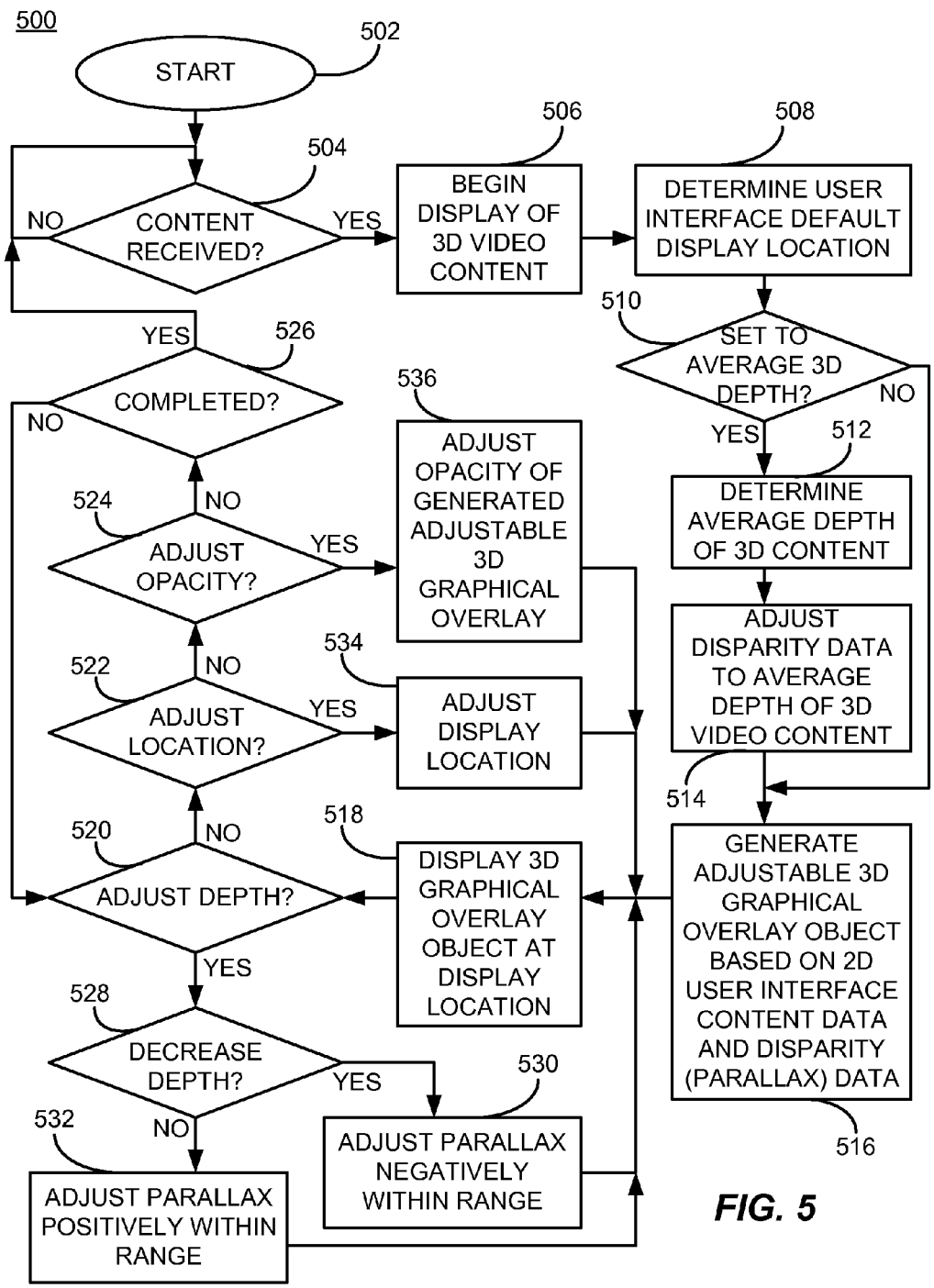
FIG. 5 is a flow chart of an example of an implementation of a process that provides automated 2D to 3D user interface content data conversion for 3D graphical overlays consistent with certain embodiments of the present invention.

FIG. 5 is a flow chart of an example of an implementation of a process 500 that provides automated 2D to 3D user interface content data conversion for 3D graphical overlays. The process 500 starts at 502. At decision point 504, the process 500 makes a determination as to whether content has been received. As described above and in more detail below, the content may include 3D video content and 2D user interface content data. The 2D user interface content data may include, for example, subtitle text content, closed caption text content, or other 2D formatted content. For purposes of the present example, one or two copies of the 2D user interface content data may be received, as described in more detail below. Further as described above, the received 2D user interface content data may also include disparity data that provides information associated with a horizontal displacement of left and right 2D user interface images for creation of a 3D user interface element. It should be noted that a differential directional displacement other than horizontal may be used without departure from the scope of the present subject matter as appropriate for a given implementation. Alternatively, disparity data may be stored locally to the display device 300, such as within the memory 310. When a determination is made that content has been received, the process 500 begins display of the 3D video content at block 506. At block 508, the process 500 determines a user interface default display location.

At decision point 510, the process 500 makes a determination as to whether to set display of a resulting 3D user interface element to an average 3D depth or some other default depth of the displayed 3D video content. For purposes of the present example, the determination to set the display of the resulting 3D user interface element to the average 3D depth of the displayed 3D video content may be made in response to a configured initial setting that allows override of received disparity data or in response to analysis of the received or locally-stored disparity data and any configured threshold(s) of difference for initial display of a generated 3D user interface element relative to received 3D video content.

In response to determining to set display of a resulting 3D user interface element to the average 3D depth of the 3D video content, the process 500 determines the average depth of the 3D video content at block 512. Determination of the depth of the 3D video content may be determined, for example, by analysis of the 3D video content or based upon metadata received with the 3D video content. At block 514, the process 500 adjusts the received or locally retrieved disparity data to the determined average depth of the 3D video content. As such, a resulting 3D user interface element generated based upon the disparity data may be rendered at the average depth of the 3D video content initially, and adjusted in response to detection of user input size adjustment requests.

In response to adjusting the disparity data to the average depth of the 3D video content at block 514, or in response to determining at decision point 510 not to set the depth of the 3D user interface element to the average depth of the 3D video content, the process 500 generates an adjustable 3D graphical overlay object based upon the received 2D user interface content data and the disparity (parallax) data at block 516. Though not illustrated for ease of illustration purposes, additional processing to copy the received 2D user interface content data may be performed at block 516 if one copy of the 2D user interface content data was received. An example of such processing is described in association with FIG. 6A below. At block 518, the process 500 displays the generated adjustable 3D graphical overlay object at the display location. Within a first iteration of the process 500, the display location will be the default display location described above. Subsequent iterations of the process 500 may result in movement of the generated 3D graphical overlay object to one or more different display locations.

In response to displaying the generated adjustable 3D graphical overlay object at the display location, the process 500 enters iterative processing associated with adjustments to the displayed 3D graphical overlay object. At decision point 520, the process 500 makes a determination as to whether a depth adjustment request has been detected. A depth adjustment request may be received, for example, from a user via a remote control device (not shown), such as via the infrared input device 304. When a determination is made that a depth adjustment request has not been detected, the process 500 makes a determination at decision point 522 as to whether a request to adjust a display location of the displayed 3D graphical overlay object has been detected. As with other detected requests described herein, this request may also be detected in response, for example, to user input via a remote control device (not shown). When a determination is made at decision point 522 that a request to adjust a display location of the displayed 3D graphical overlay object has not been received, the process 500 makes a determination at decision point 524 as to whether a request to adjust an opacity of the displayed 3D graphical overlay object relative to the displayed 3D video content has been detected. In response to determining that a request to adjust the opacity of the displayed 3D graphical overlay object relative to the displayed 3D video content has not been detected, the process 500 makes a determination at decision point 526 as to whether processing has been completed. In response to determining that processing has not been completed, the process 500 returns to decision point 520 and iterates as described above.

Returning to the description of decision point 520, in response to determining that a request to adjust a displayed depth of the 3D graphical overlay object has been detected, the process 500 makes a determination at decision point 528 as to whether the request to adjust the depth of the 3D graphical overlay object is a request to decrease the depth of the displayed 3D graphical overlay object (e.g., adjust the depth toward the viewer) or a request to increase the depth (e.g., adjust the depth away from the viewer). In response to determining that the request is a request to decrease the depth of the 3D graphical overlay object (e.g., adjust the depth toward the viewer), the process 500 adjusts parallax negatively within any defined range of parallax adjustment associated with the disparity data at block 530. It should be understood that a range of parallax adjustment may be provided and received in association with the disparity data, or may be generated and stored as part of a configuration for a display device, such as the display device 300. The range of parallax adjustment may include, for example, a range of zero disparity to a maximum disparity corresponding to a maximum depth of displayed 3D video content. However, it is understood that other ranges of parallax adjustment are possible and all are considered within the scope of the present subject matter. Further, adjusting the parallax negatively adjusts the disparity data to make the 3D graphical overlay object appear to become closer to the viewer, though as described above, additional processing may also be performed to cause the 3D graphical overlay object to appear to increase in size and to adjust perspective of the 3D graphical overlay object relative to the 3D video content. Moreover, changing the disparity makes the overlay data appear to change position by movement toward the viewer or away from the viewer relative to the 3D video content.

It should further be noted that in certain situations, such as for merging of 2D user interface elements with side-by-side 3D content or with other formats to form a 3D user interface element, negative adjustment of parallax may result in aliasing of the resulting 3D user interface element. As such, a determination that aliasing of a portion of generated 3D user interface element may be made and a depth decrease limit that avoids the aliasing of the portion of the generated 3D user interface content data may be made. In such an implementation, an adjustment of the parallax data negatively may include adjusting the parallax data negatively to the depth decrease limit that avoids the aliasing of the portion of the generated 3D user interface content data.

Returning to the description of decision point 528, in response to determining that the request to adjust the depth of the displayed 3D graphical overlay object is not a request to decrease the depth of the 3D graphical overlay object (e.g., that it is a request to increase the depth away from the viewer), the process 500 adjusts the parallax positively within any defined range of parallax adjustment associated with the disparity data, as described above, to make the displayed 3D graphical overlay object appear further away within the 3D display at block 532. As described above, additional processing may also be performed to cause the 3D graphical overlay object to appear to decrease in size and to adjust perspective of the 3D graphical overlay object relative to the 3D video content.

In response to adjusting the parallax negatively within any defined range at block 530, or in response to adjusting the parallax positively within any defined range at block 532, the process 500 returns to block 518 to display the adjusted 3D graphical overlay object at the display location and iterates as described above.

Returning to the description of decision point 522, in response to determining that a request to adjust a display location of the 3D graphical overlay object has been detected, the process 500 adjusts the display location of the displayed 3D graphical overlay object at block 534. Adjusting the display location may include, for example, adjusting X and Y coordinates for display of the 3D graphical overlay object. The process 500 returns to block 518 to display the 3D graphical overlay object at the adjusted display location and iterates as described above.

Returning to the description of decision point 524, in response to determining that a request to adjust the opacity of the 3D graphical overlay object has been detected, the process 500 adjusts the opacity of the generated adjustable 3D graphical overlay object at block 536. Adjustment of opacity may include, for example, adjusting transparency of the 3D graphical overlay object relative to the displayed 3D video content. Adjustment of opacity may include, for example, adjusting a balance between transparency and depth of the displayed 3D graphical overlay object. In response to adjusting the opacity of the 3D graphical overlay object, the process 500 returns to block 518 to display the 3D graphical overlay object at the display location and iterates as described above.

Returning to the description of decision point 526, in response to determining that processing has been completed, the process 500 returns to decision point 504 to await receipt of new content. As such, the process 500 receives 3D video content and 2D user interface content data. The 2D user interface content data may have associated disparity data or disparity data may be retrieved from local memory. The process 500 generates an adjustable 3D graphical overlay object, displays the generated adjustable 3D graphical overlay object, and detects requests to adjust a depth (and size for certain implementations), a location, and an opacity of the adjustable 3D graphical overlay object. The process 500 iteratively processes such detected requests.

Figure 6A:
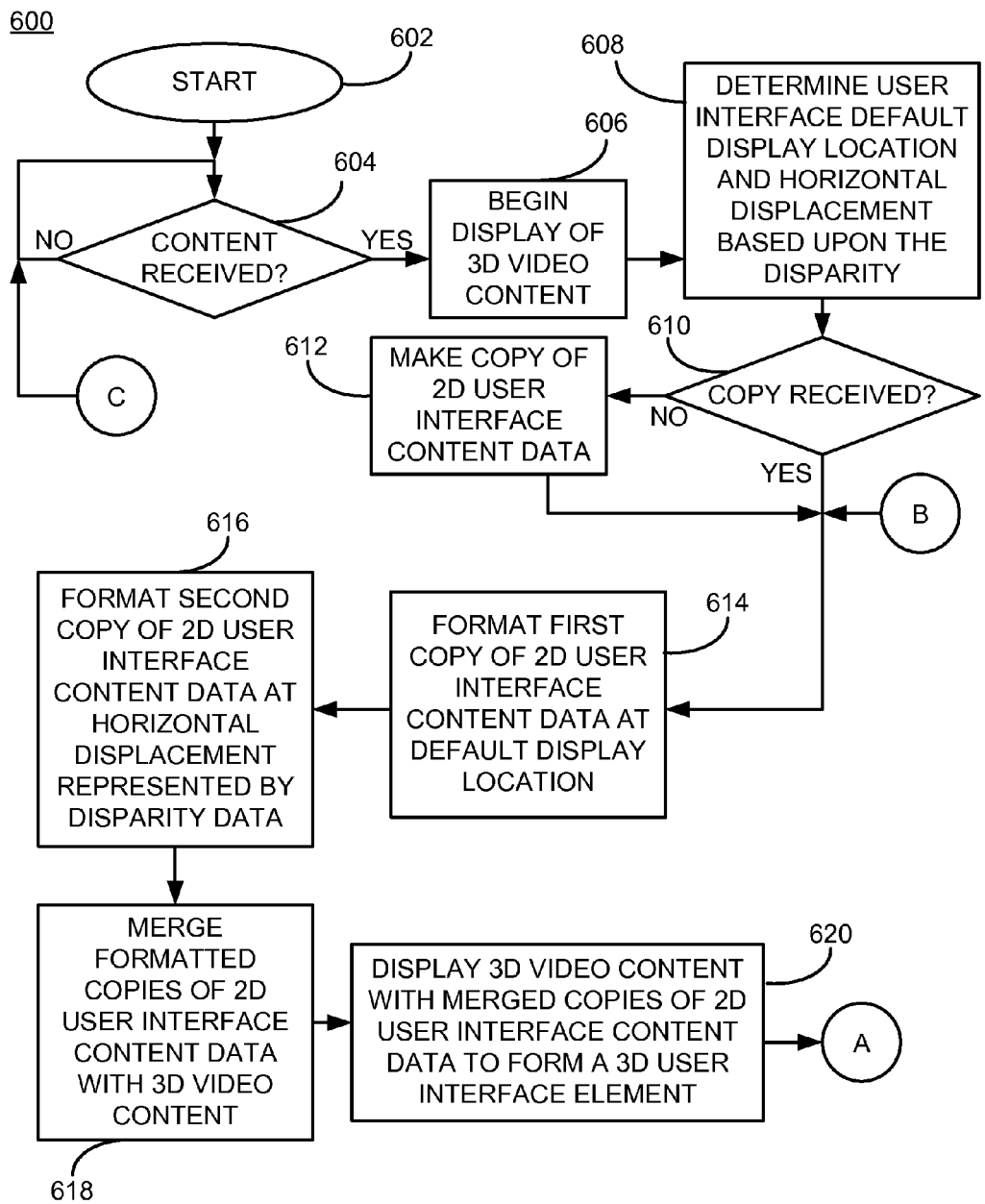
FIG. 6A is a flow chart of an example of an implementation of initial processing of a process for automated 2D to 3D user interface content data conversion for generating a 3D user interface element by merging two copies of 2D user interface content with the right and left images of 3D video content consistent with certain embodiments of the present invention.
Figure 6B:
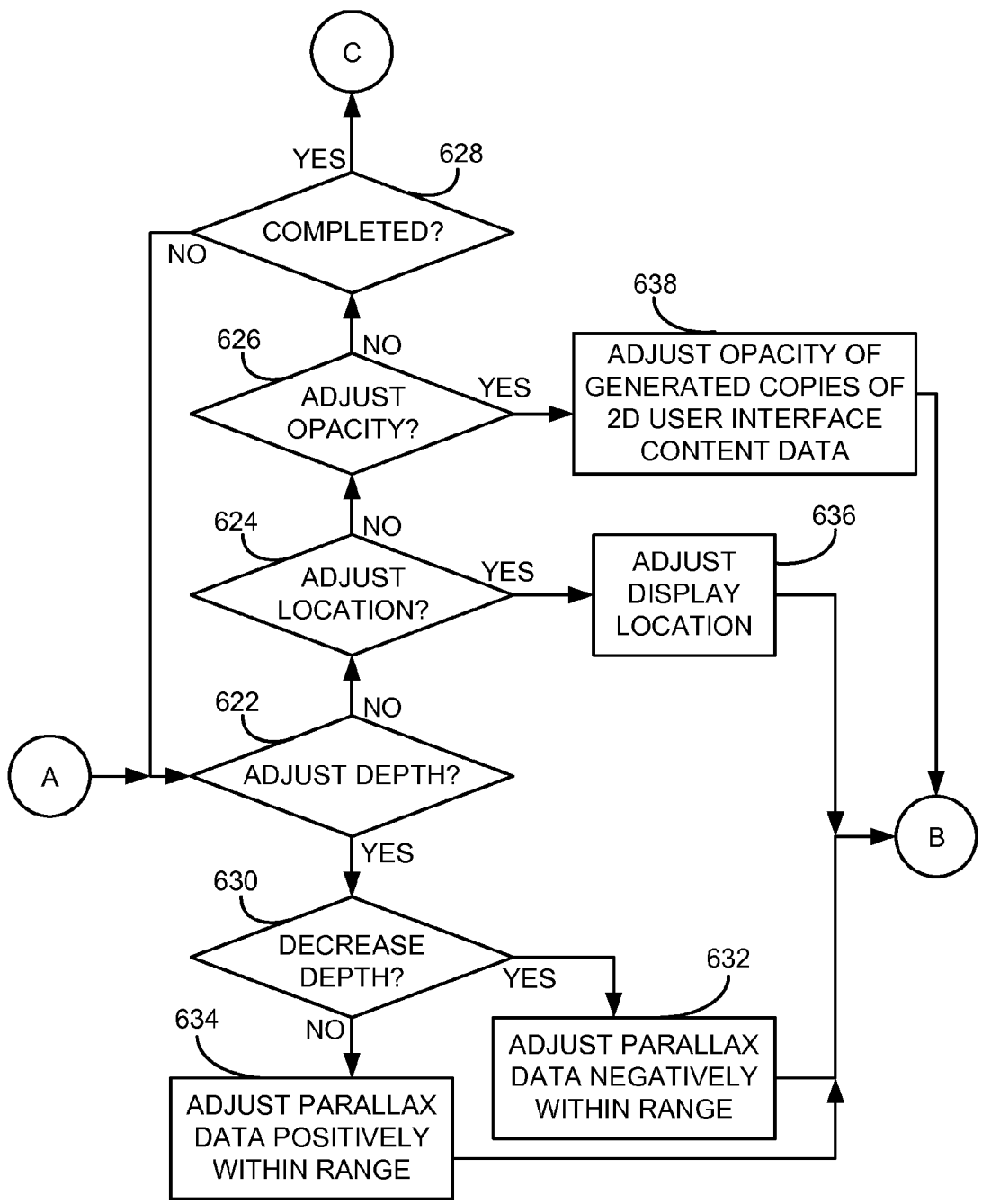
FIG. 6B is a flow chart of an example of an implementation of additional processing of the process of FIG. 6A for automated 2D to 3D user interface content data conversion for generating a 3D user interface element by merging the two copies of 2D user interface content with the right and left images of 3D video content consistent with certain embodiments of the present invention.

FIGS. 6A-6B illustrate a flow chart of an example of an implementation of a process 600 for automated 2D to 3D user interface content data conversion for generating a 3D user interface element by merging two copies of 2D user interface content with the right and left images of 3D video content. FIG. 6A illustrates initial processing within the process 600. The process 600 starts at 602. At decision point 604, the process 600 makes a determination as to whether content has been received. As described above, the content may include 3D video content and 2D user interface content data. The 2D user interface content data may include, for example, subtitle text content, closed caption text content, or other 2D formatted content. For purposes of the present example, one or two copies of the 2D user interface content data may be received, as described in more detail below. Further as described above, the received 2D user interface content data may also include disparity data that provides information associated with a horizontal displacement of left and right 2D user interface images for creation of a 3D user interface element. It should be noted that a differential directional displacement other than horizontal may be used without departure from the scope of the present subject matter as appropriate for a given implementation. Alternatively, disparity data may be stored locally to the display device 300, such as within the memory 310. In response to determining that content has been received, the process 600 begins displaying the 3D video content at block 606. At block 608, the process 600 determines a user interface default display location and determines a horizontal displacement for generation of the 3D user interface element based upon the disparity data.

At decision point 610, the process 600 makes a determination as to whether a copy of the 2D user interface content data was received (e.g., two copies received). In response to determining that the received 2D user interface content data included only a single copy of the 2D user interface content data, the process 600 makes a copy of the received 2D user interface content data at block 612. In response to making the copy of the 2D user interface content data at block 612, or in response to determining that two copies of the 2D user interface content data were received at decision point 610, the process 600 formats the first copy of the 2D user interface content data at the defined (e.g., default) display location at block 614. At block 616, the process 600 formats the second copy of the 2D user interface content data at a horizontal displacement from the defined display location represented by the disparity data. It is understood that additional processing to determine whether the 3D video content is frame sequential formatted 3D video content, side-by-side formatted 3D video content, or top-and-bottom formatted 3D video content may be performed. Further, the processing at blocks 614 and 616 to format the copies of the 2D user interface content data may include formatting the copies of the 2D user interface content data as appropriate for the format of the 3D video content format.

For example, where the 3D video content format is frame sequential, the first copy of the 2D user interface content may be placed within a blank frame in preparation for merging with a left frame of 3D video content, while the second copy of the 2D user interface content may be placed within a blank frame in preparation for merging with a right frame of 3D video content.

For side-by-side formatted 3D video content, a side-by-side formatted version of the first copy of the 2D user interface content data may be generated at the default display location, while a side-by-side formatted version of the second copy of the 2D user interface content data may be generated at the determined horizontal displacement represented by the disparity data.

For top-and-bottom formatted 3D video content, a top-and-bottom formatted version of the first copy of the 2D user interface content data may be generated at the default display location, while a top-and-bottom formatted version of the second copy of the 2D user interface content data may be generated at the determined horizontal displacement represented by the disparity data.

At block 618, the process 600 merges the formatted copies of the 2D user interface content data with the 3D video content. Merging of the formatted copies of the 2D user interface content data with the 3D video content may include, for example, alpha blending the formatted copies of the 2D user interface content with the respective copies (e.g., left and right views) of the 3D video content. Alternatively, merging of the formatted copies of the 2D user interface content data with the 3D video content may include overlaying the left and right 2D user interface content data onto the left and right views of the 3D video content. Alpha blending may be preferred for implementations where transparency of the 3D user interface element within the 3D video content is desired.

At block 620, the process 600 displays the 3D video content with the merged copies of the 2D user interface content data to form the 3D user interface element within the displayed 3D video content. The process 600 transitions to the processing shown and described in association with FIG. 6B.

FIG. 6B illustrates additional processing associated with the process 600 for automated 2D to 3D user interface content data conversion for generating a 3D user interface element by merging the two copies of 2D user interface content with the right and left images of 3D video content. At decision point 622, the process 600 enters an iterative process associated with adjustments to the displayed 3D user interface element. As such, at decision point 622, the process 600 makes a determination as to whether a depth adjustment request has been detected. A depth adjustment request may be received, for example, from a user via a remote control device (not shown), such as via the infrared input device 304. When a determination is made that a depth adjustment request has not been detected, the process 600 makes a determination at decision point 624 as to whether a request to adjust a display location of the displayed 3D user interface element has been detected. As with other detected requests described herein, this request may also be detected in response, for example, to user input via a remote control device (not shown). When a determination is made at decision point 624 that a request to adjust a display location of the displayed 3D user interface element has not been received, the process 600 makes a determination at decision point 626 as to whether a request to adjust an opacity of the displayed 3D user interface element relative to the displayed 3D video content has been detected. In response to determining that a request to adjust the opacity of the displayed 3D user interface element relative to the displayed 3D video content has not been detected, the process 600 makes a determination at decision point 628 as to whether processing has been completed. In response to determining that processing has not been completed, the process 600 returns to decision point 622 and iterates as described above.

Returning to the description of decision point 622, in response to determining that a request to adjust a displayed depth of the 3D user interface element has been detected, the process 600 makes a determination at decision point 630 as to whether the request to adjust the depth of the 3D user interface element is a request to decrease the depth of the 3D user interface element (e.g., adjust the depth toward the viewer) or a request to increase the depth (e.g., adjust the depth away from the viewer). In response to determining that the request is a request to decrease the depth of the 3D user interface element (e.g., adjust the depth toward the viewer), the process 600 adjusts the parallax negatively within any defined range of parallax adjustment associated with the disparity data at block 632. As discussed above, it should be understood that a range of parallax adjustment may be provided and received in association with the disparity data, or may be generated and stored as part of a configuration for a display device, such as the display device 300. Further, adjusting the parallax negatively adjusts the disparity data to make the 3D user interface element appear to become closer to the viewer, though as described above, additional processing may also be performed to cause the 3D user interface element to appear to increase in size and to adjust perspective of the 3D user interface element relative to the 3D video content. Moreover, changing the disparity makes the overlay data appear to change position by movement toward the viewer or away from the viewer relative to the 3D video content.

As described above, in certain situations, such as for merging of 2D user interface elements with side-by-side 3D content or with other formats to form a 3D user interface element, negative adjustment of parallax may result in aliasing of the resulting 3D user interface element. As such, a determination that aliasing of a portion of generated 3D user interface element may be made and a depth decrease limit that avoids the aliasing of the portion of the generated 3D user interface content data may be made. In such an implementation, an adjustment of the parallax data negatively may include adjusting the parallax data negatively to the depth decrease limit that avoids the aliasing of the portion of the generated 3D user interface content data.

Returning to the description of decision point 630, in response to determining that the request to adjust the depth of the displayed 3D user interface element is not a request to decrease the depth of the 3D user interface element (e.g., that it is a request to increase the depth away from the viewer), the process 600 adjusts the parallax positively within any defined range of parallax adjustment associated with the disparity data, as described above, to make the displayed 3D user interface element appear further away within the 3D display at block 634. As described above, additional processing may also be performed to cause the 3D user interface element to appear to decrease in size and to adjust perspective of the 3D user interface element relative to the 3D video content.

In response to adjusting the parallax negatively within any defined range at block 632, or in response to adjusting the parallax positively within any defined range at block 634, the process 600 returns to block 614 (See FIG. 6A) and iterates as described above to format and merge the 2D user interface content data with the 3D video content based upon the adjusted disparity data.

Returning to the description of decision point 624, in response to determining that a request to adjust a display location of the 3D user interface element has been detected, the process 600 adjusts the display location for the displayed 3D user interface element at block 636. Adjusting the display location may include, for example, adjusting X and Y coordinates for display of the 3D user interface element. The process 600 returns to block 614 (See FIG. 6A) and iterates as described above to format and merge the 2D user interface content data with the 3D video content at the new display location.

Returning to the description of decision point 626, in response to determining that a request to adjust the opacity of the 3D user interface element has been detected, the process 600 adjusts the opacity of the generated copies of the 2D user interface content data at block 638. Adjustment of opacity may include, for example, adjusting transparency of each copy of the 2D user interface content data relative to the displayed 3D video content, as described above. In response to adjusting the opacity of each copy of the 2D user interface content data, the process 600 and returns to block 614 (See FIG. 6A) and iterates as described above to format and merge the 2D user interface content data with the 3D video content at the new opacity.

Returning to the description of decision point 628, in response to determining that processing has been completed, the process 600 returns to decision point 604 (See FIG. 6A) to await receipt of new content.

As such, the process 600 receives 3D video content and 2D user interface content data. The 2D user interface content data may have associated disparity data or disparity data may be retrieved from local memory. The process 600 generates a 3D user interface element by formatting and merging each copy of the 2D user interface content data with one of a left and a right image of the 3D video content, with the second copy of the 2D user interface content data merged at a horizontal displacement relative to the first copy. The process 600 displays the generated 3D user interface element, and detects requests to adjust a depth (and size for certain implementations), a location, and an opacity of the 3D user interface element. The process 600 iteratively processes such detected requests and allows user requested changes to a depth of the 3D user interface element, to a location of the 3D user interface element, and to the opacity of the 3D user interface element relative to the displayed 3D video content.

Thus, in accord with certain implementations, a method of two dimensional (2D) content data conversion to three dimensional (3D) content data in a 3D television (TV) involves receiving, via a 2D to 3D content conversion module, 3D video content and 2D user interface content data; determining a displacement represented by disparity data that defines a separation of left eye and right eye data for 3D rendering of the 2D user interface content data; displaying the 3D video content on a display of the 3D TV; and generating 3D user interface content data at a 3D depth on the display based upon the received 2D user interface content data and the determined displacement.

In certain implementations, the method of 2D content data conversion to 3D content data in a 3D TV further involves receiving the disparity data with the 2D user interface content data. In certain implementations, the method further involves generating the disparity data. In certain implementations, the method further involves determining the 3D depth based upon the disparity data. In certain implementations, the method of generating the 3D user interface content data at the 3D depth on the display based upon the received 2D user interface content data and the determined displacement involves merging the 2D user interface content data with frame sequential left-image frames of the 3D video content at a location within the 3D video content; and merging the 2D user interface content data with frame sequential right-image frames of the 3D video content at the determined displacement from the location of the merged 2D user interface content data with the frame sequential left-image frames of the 3D video content based upon the disparity data. In certain implementations, the method of receiving, via the 2D to 3D content conversion module, the 3D video content and the 2D user interface content data involves receiving, via the 2D to 3D content conversion module, the 3D video content, a first copy of the 2D user interface content data, a second copy of the 2D user interface content data, and the disparity data; and the method of generating the 3D user interface content data at the 3D depth on the display based upon the received 2D user interface content data and the determined displacement involves merging the first copy of the 2D user interface content data with left-image stripes of the 3D video content at a location within the 3D video content; and merging the second copy of the 2D user interface content data with right-image stripes of the 3D video content at the determined displacement from the location of the merged first copy of the 2D user interface content data with the left-image stripes of the 3D video content based upon the disparity data. In certain implementations, the method of generating the 3D user interface content data at the 3D depth on the display based upon the received 2D user interface content data and the determined displacement involves generating a copy of the received 2D user interface content data; merging the received 2D user interface content data with left-image stripes of the 3D video content at a location within the 3D video content; and merging the copy of the 2D user interface content data with right-image stripes of the 3D video content at the determined displacement from the location of the merged received 2D user interface content data with the left-image stripes of the 3D video content based upon the disparity data. In certain implementations, the method of generating the 3D user interface content data at the 3D depth on the display based upon the received 2D user interface content data and the determined displacement involves generating a 3D graphical overlay object based upon the received 2D user interface content data and the determined displacement; and displaying the 3D graphical overlay object at a location on the display over the displayed 3D video content. In certain implementations, the method further involves detecting a user input indicating a request to adjust a display depth of the generated 3D user interface content data; determining an adjusted displacement based upon the request to adjust the display depth of the generated 3D user interface content data; and generating adjusted 3D user interface content data at an adjusted 3D depth on the display based upon the received 2D user interface content data and the adjusted displacement. In certain implementations, the disparity data includes parallax data and the method further involves determining whether the request to adjust the display depth of the generated 3D user interface content data includes one of a request to decrease the display depth of the generated 3D user interface content data and a request to increase the display depth of the generated 3D user interface content data; and the method of generating the adjusted 3D user interface content data at the adjusted 3D depth on the display based upon the received 2D user interface content data and the adjusted displacement involves adjusting the parallax data negatively in response to determining that the request to adjust the display depth of the generated 3D user interface content data includes the request to decrease the display depth of the generated 3D user interface content data; and adjusting the parallax data positively in response to determining that the request to adjust the display depth of the generated 3D user interface content data includes the request to increase the display depth of the generated 3D user interface content data. In certain implementations, the method further involves determining that the request to adjust the display depth of the generated 3D user interface content data includes the request to decrease the display depth of the generated 3D user interface content data; determining that aliasing of at least one portion of the generated 3D user interface content data will result from the requested decrease in the display depth of the generated 3D user interface content data; determining a depth decrease limit that avoids the aliasing of the at least one portion of the generated 3D user interface content data; and the method of adjusting the parallax data negatively in response to determining that the request to adjust the display depth of the generated 3D user interface content data includes the request to decrease the display depth of the generated 3D user interface content data involves adjusting the parallax data negatively to the depth decrease limit that avoids the aliasing of the at least one portion of the generated 3D user interface content data. In certain implementations, the disparity data includes a range of disparity data from zero disparity to a maximum disparity corresponding to a maximum depth of the displayed 3D video content and the method further involves detecting a user input indicating a request to adjust a display depth of the generated 3D user interface content data; adjusting the disparity data within the range of disparity data in response to the request to adjust the display depth of the displayed 3D user interface content data; determining an adjusted displacement based upon the adjusted disparity data; and generating adjusted 3D user interface content data at an adjusted 3D depth on the display based upon the received 2D user interface content data and the adjusted displacement. In certain implementations, the method further involves detecting a user input indicating a request to adjust a display location of the generated 3D user interface content data; and adjusting the display location of the generated 3D user interface content data in response to the detected request. In certain implementations, the method further involves determining an average depth of the displayed 3D video content; adjusting the disparity data to the determined average depth of the displayed 3D video content; and the method of determining the displacement represented by the disparity data involves determining the displacement based upon the adjusted disparity data. In certain implementations, the received 2D user interface content data includes one of subtitle text content and closed caption text content. In certain implementations, the 3D video content includes frame sequential 3D video content. In certain implementations, the 3D video content includes one of side-by-side formatted 3D video content and top-and-bottom formatted 3D video content. In certain implementations, the method further involves detecting a user input indicating a request to adjust an opacity of the 3D user interface content data relative to the displayed 3D video content; and adjusting the opacity of the 3D user interface content data relative to the displayed 3D video content. In certain implementations, the method of adjusting the opacity of the 3D user interface content data relative to the displayed 3D video content involves one of adjusting transparency and the disparity data of the 3D user interface content data relative to the displayed 3D video content.

In another implementation, a computer readable storage medium may store instructions which, when executed on one or more programmed processors, carry out a process of two dimensional (2D) content data conversion to three dimensional (3D) content data in a 3D television (TV) and involves receiving 3D video content and 2D user interface content data; determining a displacement represented by disparity data that defines a separation of left eye and right eye data for 3D rendering of the 2D user interface content data; displaying the 3D video content on a display of the 3D TV; and generating 3D user interface content data at a 3D depth on the display based upon the received 2D user interface content data and the determined displacement.

A three dimensional (3D) television device consistent with another implementation has a memory, a display, and a processor programmed to receive 3D video content and 2D user interface content data; determine a displacement represented by disparity data that defines a separation of left eye and right eye data for 3D rendering of the 2D user interface content data; display the 3D video content on the display; and generate 3D user interface content data at a 3D depth on the display based upon the received 2D user interface content data and the determined displacement.

In certain implementations, the processor is further programmed to receive the disparity data with the 2D user interface content data. In certain implementations, the processor is further programmed to generate the disparity data. In certain implementations, the processor is further programmed to determine the 3D depth based upon the disparity data. In certain implementations, in being programmed to generate the 3D user interface content data at the 3D depth on the display based upon the received 2D user interface content data and the determined displacement, the processor is programmed to merge the 2D user interface content data with frame sequential left-image frames of the 3D video content at a location within the 3D video content; and merge the 2D user interface content data with frame sequential right-image frames of the 3D video content at the determined displacement from the location of the merged 2D user interface content data with the frame sequential left-image frames of the 3D video content based upon the disparity data. In certain implementations, in being programmed to receive the 3D video content and the 2D user interface content data, the processor is programmed to receive the 3D video content, a first copy of the 2D user interface content data, a second copy of the 2D user interface content data, and the disparity data; and in being programmed to generate the 3D user interface content data at the 3D depth on the display based upon the received 2D user interface content data and the determined displacement, the processor is programmed to merge the first copy of the 2D user interface content data with left-image stripes of the 3D video content at a location within the 3D video content; and merge the second copy of the 2D user interface content data with right-image stripes of the 3D video content at the determined displacement from the location of the merged first copy of the 2D user interface content data with the left-image stripes of the 3D video content based upon the disparity data. In certain implementations, in being programmed to generate the 3D user interface content data at the 3D depth on the display based upon the received 2D user interface content data and the determined displacement, the processor is programmed to generate a copy of the received 2D user interface content data; merge the received 2D user interface content data with left-image stripes of the 3D video content at a location within the 3D video content; and merge the copy of the 2D user interface content data with right-image stripes of the 3D video content at the determined displacement from the location of the merged received 2D user interface content data with the left-image stripes of the 3D video content based upon the disparity data. In certain implementations, in being programmed to generate the 3D user interface content data at the 3D depth on the display based upon the received 2D user interface content data and the determined displacement, the processor is programmed to generate a 3D graphical overlay object based upon the received 2D user interface content data and the determined displacement; and display the 3D graphical overlay object at a location on the display over the displayed 3D video content. In certain implementations, the 3D television device includes a user input device; and the processor is further programmed to detect a user input via the user input device indicating a request to adjust a display depth of the generated 3D user interface content data; determine an adjusted displacement based upon the request to adjust the display depth of the generated 3D user interface content data; and generate adjusted 3D user interface content data at an adjusted 3D depth on the display based upon the received 2D user interface content data and the adjusted displacement. In certain implementations, the disparity data includes parallax data and the processor is further programmed to determine whether the request to adjust the display depth of the generated 3D user interface content data includes one of a request to decrease the display depth of the generated 3D user interface content data or a request to increase the display depth of the generated 3D user interface content data; and in being programmed to generate the adjusted 3D user interface content data at the adjusted 3D depth on the display based upon the received 2D user interface content data and the adjusted displacement, the processor is programmed to adjust the parallax data negatively in response to determining that the request to adjust the display depth of the generated 3D user interface content data includes the request to decrease the display depth of the generated 3D user interface content data; and adjust the parallax data positively in response to determining that the request to adjust the display depth of the generated 3D user interface content data includes the request to increase the display depth of the generated 3D user interface content data. In certain implementations, the processor is further programmed to determine that the request to adjust the display depth of the generated 3D user interface content data includes the request to decrease the display depth of the generated 3D user interface content data; determine that aliasing of at least one portion of the generated 3D user interface content data will result from the requested decrease in the display depth of the generated 3D user interface content data; determine a depth decrease limit that avoids the aliasing of the at least one portion of the generated 3D user interface content data; and in being programmed to adjust the parallax data negatively in response to determining that the request to adjust the display depth of the generated 3D user interface content data includes the request to decrease the display depth of the generated 3D user interface content data, the processor is programmed to adjust the parallax data negatively to the depth decrease limit that avoids the aliasing of the at least one portion of the generated 3D user interface content data. In certain implementations, the disparity data includes a range of disparity data from zero disparity to a maximum disparity corresponding to a maximum depth of the displayed 3D video content, the 3D television device includes a user input device; and the processor is further programmed to detect a user input via the user input device indicating a request to adjust a display depth of the generated 3D user interface content data; adjust the disparity data within the range of disparity data in response to the request to adjust the display depth of the displayed 3D user interface content data; determine an adjusted displacement based upon the adjusted disparity data; and generate adjusted 3D user interface content data at an adjusted 3D depth on the display based upon the received 2D user interface content data and the adjusted displacement. In certain implementations, the 3D television device includes a user input device; and the processor is further programmed to detect a user input via the user input device indicating a request to adjust a display location of the generated 3D user interface content data; and adjust the display location of the generated 3D user interface content data in response to the detected request. In certain implementations, the processor is further programmed to determine an average depth of the displayed 3D video content; adjust the disparity data to the determined average depth of the displayed 3D video content; and in being programmed to determine the displacement represented by the disparity data, the processor is programmed to determine the displacement based upon the adjusted disparity data. In certain implementations, the received 2D user interface content data includes one of subtitle text content and closed caption text content. In certain implementations, the 3D video content includes frame sequential 3D video content. In certain implementations, the 3D video content includes one of side-by-side formatted 3D video content and top-and-bottom formatted 3D video content. In certain implementations, the 3D television includes a user input device; and the processor is further programmed to detect a user input via the user input device indicating a request to adjust an opacity of the 3D user interface content data relative to the displayed 3D video content; and adjust the opacity of the 3D user interface content data relative to the displayed 3D video content. In certain implementations, in being programmed to adjust the opacity of the 3D user interface content data relative to the displayed 3D video content, the processor is programmed to one of adjust transparency and the disparity data of the 3D user interface content data relative to the displayed 3D video content.

Those skilled in the art will recognize, upon consideration of the above teachings, that certain of the above exemplary embodiments may be based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of two dimensional (2D) content data conversion to three dimensional (3D) content data in a 3D television (TV), comprising:
   receiving, via a 2D to 3D content conversion module, frame sequential 3D video content and 2D user interface content data;
   determining a displacement represented by disparity data that defines a separation of left eye and right eye data for 3D rendering of the 2D user interface content data;

determining a size of the 3D rendering of the 2D user interface content using pixel modification;
displaying the 3D video content on a display of the 3D TV; and
generating 3D user interface content data at a 3D depth on the display based upon the received 2D user interface content data and the determined displacement and size,
where generating the 3D user interface content data at the 3D depth on the display based upon the received 2D user interface content data and the determined displacement comprises:
providing first and second copies of the 2D user interface content data;
placing the first copy of the 2D user interface content data in a first blank frame;
merging the 2D user interface content data in the first frame with frame sequential left-image frames of the 3D video content at a location within the 3D video content;
placing the second copy of the 2D user interface content data in a second blank frame;
merging the 2D user interface content data in the second frame with frame sequential right-image frames of the 3D video content at the determined size and displacement from the location of the merged 2D user interface content data with the frame sequential left-image frames of the 3D video content based upon the disparity data.

2. The method according to claim 1, further comprising receiving the disparity data and size with the 2D user interface content data.

3. The method according to claim 1, further comprising generating the disparity data.

4. The method according to claim 1, further comprising determining the 3D depth based upon the disparity data.

5. The method according to claim 1, where:
receiving, via the 2D to 3D content conversion module, the 3D video content and the 2D user interface content data comprises:
receiving, via the 2D to 3D content conversion module, the 3D video content, the first copy of the 2D user interface content data, the second copy of the 2D user interface content data, and the disparity data.

6. The method according to claim 1, where generating the 3D user interface content data at the 3D depth on the display based upon the received 2D user interface content data and the determined displacement comprises:
generating the first and second copies of the received 2D user interface content data.

7. The method according to claim 1, where generating the 3D user interface content data at the 3D depth on the display based upon the received 2D user interface content data and the determined displacement and size comprises:
generating a 3D graphical overlay object based upon the received 2D user interface content data and the determined displacement; and
displaying the 3D graphical overlay object at a location on the display over the displayed 3D video content.

8. The method according to claim 1, further comprising:
detecting a user input indicating a request to adjust a display depth of the generated 3D user interface content data;
detecting a user input indicating a request to adjust a size of the generated 3D user interface content data;
determining an adjusted displacement based upon the request to adjust the display depth of the generated 3D user interface content data;
determining an adjusted displacement based upon the request to adjust the size of the generated 3D user interface content data; and
generating adjusted 3D user interface content data at an adjusted 3D depth on the display based upon the received 2D user interface content data and the adjusted size and displacement.

9. The method according to claim 8, where the disparity data comprises parallax data and further comprising:
determining whether the request to adjust the display depth of the generated 3D user interface content data comprises one of a request to decrease the display depth of the generated 3D user interface content data and a request to increase the display depth of the generated 3D user interface content data; and
where generating the adjusted 3D user interface content data at the adjusted 3D depth on the display based upon the received 2D user interface content data and the adjusted displacement comprises:
adjusting the parallax data negatively in response to determining that the request to adjust the display depth of the generated 3D user interface content data comprises the request to decrease the display depth of the generated 3D user interface content data; and
adjusting the parallax data positively in response to determining that the request to adjust the display depth of the generated 3D user interface content data comprises the request to increase the display depth of the generated 3D user interface content data.

10. The method according to claim 9, further comprising:
determining that the request to adjust the display depth of the generated 3D user interface content data comprises the request to decrease the display depth of the generated 3D user interface content data;
determining that aliasing of at least one portion of the generated 3D user interface content data will result from the requested decrease in the display depth of the generated 3D user interface content data;
determining a depth decrease limit that avoids the aliasing of the at least one portion of the generated 3D user interface content data; and
where adjusting the parallax data negatively in response to determining that the request to adjust the display depth of the generated 3D user interface content data comprises the request to decrease the display depth of the generated 3D user interface content data comprises:
adjusting the parallax data negatively to the depth decrease limit that avoids the aliasing of the at least one portion of the generated 3D user interface content data.

11. The method according to claim 1, where the disparity data comprises a range of disparity data from zero disparity to a maximum disparity corresponding to a maximum depth of the displayed 3D video content and further comprising:
detecting a user input indicating a request to adjust a display depth of the generated 3D user interface content data;
adjusting the disparity data within the range of disparity data in response to the request to adjust the display depth of the displayed 3D user interface content data;
determining an adjusted displacement based upon the adjusted disparity data; and
generating adjusted 3D user interface content data at an adjusted 3D depth on the display based upon the received 2D user interface content data and the adjusted displacement.

12. The method according to claim 1, further comprising:
  detecting a user input indicating a request to adjust a display location and size of the generated 3D user interface content data; and
  adjusting the display location of the generated 3D user interface content data in response to the detected request.
13. The method according to claim 1, further comprising:
  determining an average depth of the displayed 3D video content;
  adjusting the disparity data to the determined average depth of the displayed 3D video content; and
  where determining the displacement represented by the disparity data comprises determining the displacement based upon the adjusted disparity data.
14. The method according to claim 1, where the received 2D user interface content data comprises one of subtitle text content and closed caption text content.
15. The method according to claim 1, further comprising:
  detecting a user input indicating a request to adjust an opacity of the 3D user interface content data relative to the displayed 3D video content; and
  adjusting the opacity of the 3D user interface content data relative to the displayed 3D video content.
16. The method according to claim 15, where adjusting the opacity of the 3D user interface content data relative to the displayed 3D video content comprises one of adjusting transparency and the disparity data of the 3D user interface content data relative to the displayed 3D video content.
17. A non-transitory computer readable storage medium storing instructions which, when executed on one or more programmed processors, carry out a method according to claim 1.
18. A three dimensional (3D) television device, comprising:
  a memory;
  a display; and
  a processor programmed to:
    receive frame sequential 3D video content and 2D user interface content data;
    determine a displacement represented by disparity data that defines a separation of left eye and right eye data for 3D rendering of the 2D user interface content data;
    determine a size of the 3D rendering of the 2D user interface content using pixel modification;
    display the 3D video content on the display; and
    generate 3D user interface content data at a 3D depth on the display based upon the received 2D user interface content data and the determined displacement and size by:
      providing first and second copies of the 2D user interface content data;
      placing the first copy of the 2D user interface content data in a first blank frame;
      merging the 2D user interface content data in the first frame with frame sequential left-image frames of the 3D video content at a location within the 3D video content;
      placing the second copy of the 2D user interface content data in a second blank frame;
      merging the 2D user interface content data in the second frame with frame sequential right-image frames of the 3D video content at the determined size and displacement from the location of the merged 2D user interface content data with the frame sequential left-image frames of the 3D video content based upon the disparity data.
19. The 3D television device according to claim 18, where the processor is further programmed to receive the disparity data and size with the 2D user interface content data.
20. The 3D television device according to claim 18, where the processor is further programmed to generate the disparity data.
21. The 3D television device according to claim 18, where the processor is further programmed to determine the 3D depth based upon the disparity data.
22. The 3D television device according to claim 18, where, in being programmed to:
  receive the 3D video content and the 2D user interface content data, the processor is programmed to:
    receive the 3D video content, the first copy of the 2D user interface content data, the second copy of the 2D user interface content data, and the disparity data.
23. The 3D television device according to claim 18, where, in being programmed to generate the 3D user interface content data at the 3D depth on the display based upon the received 2D user interface content data and the determined displacement, the processor is programmed to:
  generate the first and second copies of the received 2D user interface content data;
  merge the received 2D user interface content data with left-image stripes of the 3D video content at a location within the 3D video content.
24. The 3D television device according to claim 18, where, in being programmed to generate the 3D user interface content data at the 3D depth on the display based upon the received 2D user interface content data and the determined size and displacement, the processor is programmed to:
  generate a 3D graphical overlay object based upon the received 2D user interface content data and the determined size and displacement; and
  display the 3D graphical overlay object at a location on the display over the displayed 3D video content.
25. The 3D television device according to claim 18, further comprising:
  a user input device; and
  where the processor is further programmed to:
    detect a user input via the user input device indicating a request to adjust a display size of the generated 3D user interface content data;
    determine an adjusted displacement based upon the request to adjust the display size of the generated 3D user interface content data;
    detect a user input via the user input device indicating a request to adjust a display depth of the generated 3D user interface content data;
    determine an adjusted displacement based upon the request to adjust the display depth of the generated 3D user interface content data; and
    generate adjusted 3D user interface content data at an adjusted 3D depth on the display based upon the received 2D user interface content data and the adjusted size and displacement.
26. The 3D television device according to claim 25, where the disparity data comprises parallax data and where the processor is further programmed to:
  determine whether the request to adjust the display depth of the generated 3D user interface content data comprises one of a request to decrease the display depth of the generated 3D user interface content data or a request to increase the display depth of the generated 3D user interface content data; and
  where, in being programmed to generate the adjusted 3D user interface content data at the adjusted 3D depth on the display based upon the received 2D user interface content data and the adjusted displacement, the processor is programmed to:
  adjust the parallax data negatively in response to determining that the request to adjust the display depth of the generated 3D user interface content data comprises the request to decrease the display depth of the generated 3D user interface content data; and
  adjust the parallax data positively in response to determining that the request to adjust the display depth of the generated 3D user interface content data comprises the request to increase the display depth of the generated 3D user interface content data.

27. The 3D television device according to claim 26, where the processor is further programmed to:
  determine that the request to adjust the display depth of the generated 3D user interface content data comprises the request to decrease the display depth of the generated 3D user interface content data;
  determine that aliasing of at least one portion of the generated 3D user interface content data will result from the requested decrease in the display depth of the generated 3D user interface content data;
  determine a depth decrease limit that avoids the aliasing of the at least one portion of the generated 3D user interface content data; and
  where, in being programmed to adjust the parallax data negatively in response to determining that the request to adjust the display depth of the generated 3D user interface content data comprises the request to decrease the display depth of the generated 3D user interface content data, the processor is programmed to:
    adjust the parallax data negatively to the depth decrease limit that avoids the aliasing of the at least one portion of the generated 3D user interface content data.

28. The 3D television device according to claim 18, where the disparity data comprises a range of disparity data from zero disparity to a maximum disparity corresponding to a maximum depth of the displayed 3D video content and further comprising:
  a user input device; and
  where the processor is further programmed to:
    detect a user input via the user input device indicating a request to adjust a display depth of the generated 3D user interface content data;
    adjust the disparity data within the range of disparity data in response to the request to adjust the display depth of the displayed 3D user interface content data;
    determine an adjusted displacement based upon the adjusted disparity data; and
    generate adjusted 3D user interface content data at an adjusted 3D depth on the display based upon the received 2D user interface content data and the adjusted displacement.

29. The 3D television device according to claim 18, further comprising:
  a user input device; and
  where the processor is further programmed to:
    detect a user input via the user input device indicating a request to adjust a display location and size of the generated 3D user interface content data; and
    adjust the display location and size of the generated 3D user interface content data in response to the detected request.

30. The 3D television device according to claim 18, where the processor is further programmed to:
  determine an average depth of the displayed 3D video content;
  adjust the disparity data to the determined average depth of the displayed 3D video content; and
  where, in being programmed to determine the displacement represented by the disparity data, the processor is programmed to determine the displacement based upon the adjusted disparity data.

31. The 3D television device according to claim 18, where the received 2D user interface content data comprises one of subtitle text content and closed caption text content.

32. The 3D television device according to claim 18, further comprising:
  a user input device; and
  where the processor is further programmed to:
    detect a user input via the user input device indicating a request to adjust an opacity of the 3D user interface content data relative to the displayed 3D video content; and
    adjust the opacity of the 3D user interface content data relative to the displayed 3D video content.

33. The 3D television device according to claim 32, where, in being programmed to adjust the opacity of the 3D user interface content data relative to the displayed 3D video content, the processor is programmed to one of adjust transparency and the disparity data of the 3D user interface content data relative to the displayed 3D video content.

* * * * *